(12) United States Patent
Schroeder et al.

(10) Patent No.: US 11,431,060 B2
(45) Date of Patent: Aug. 30, 2022

(54) SEPARATOR FOR A BATTERY CELL AND BATTERY CELL PROVIDING SUCH A SEPARATOR

(71) Applicants: Robert Bosch GmbH, Stuttgart (DE); GS Yuasa International Ltd., Kyoto (JP)

(72) Inventors: Matthias Schroeder, Stuttgart (DE); Calin Iulius Wurm, Meitingen (DE); Martin Manuel Hiller, Stuttugart (DE); Franz Fuchs, Stuttgart (DE)

(73) Assignees: Robert Bosch GmbH, Stuttgart (DE); GS Yuasa International Ltd., Kyoto (JP)

( * ) Notice: Subject to any disclaimer, the term of this patent is extended or adjusted under 35 U.S.C. 154(b) by 104 days.

(21) Appl. No.: 16/462,296

(22) PCT Filed: Nov. 6, 2017

(86) PCT No.: PCT/EP2017/078297
§ 371 (c)(1),
(2) Date: May 20, 2019

(87) PCT Pub. No.: WO2018/099691
PCT Pub. Date: Jun. 7, 2018

(65) Prior Publication Data
US 2019/0319246 A1 Oct. 17, 2019

(30) Foreign Application Priority Data
Nov. 29, 2016 (EP) ..................................... 16201066

(51) Int. Cl.
*H01M 10/0525* (2010.01)
*H01M 50/449* (2021.01)

(52) U.S. Cl.
CPC ..... *H01M 50/449* (2021.01); *H01M 10/0525* (2013.01)

(58) Field of Classification Search
CPC .......... H01M 2/1686; H01M 10/0525; H01M 50/449
See application file for complete search history.

(56) References Cited

U.S. PATENT DOCUMENTS 4,298,666 A * 11/1981 Taskier ............... H01M 2/1673
429/206
8,216,712 B1 * 7/2012 Ramasubramanian ..................... H01M 2/1686
429/144

(Continued)

FOREIGN PATENT DOCUMENTS

| CN | 1694298 A | 11/2005 |
|----|-----------|---------|
| CN | 102498590 A | 6/2012 |

(Continued)

OTHER PUBLICATIONS

International Search Report corresponding to International Application No. PCT/2017/078297, dated Dec. 8, 2017 (5 pages).

(Continued)

*Primary Examiner* — Osei K Amponsah
(74) *Attorney, Agent, or Firm* — Maginot, Moore & Beck, LLP

(57) ABSTRACT

The present invention relates to a separator arrangement (20) for an electrochemical battery cell (10) comprising an ionically conductive and electrically insulating separator layer (22), characterized in that the separator arrangement (20) further comprises a reduction layer (24) comprising a reductant, wherein the reduction layer (24) has a specific surface area which is in a range of not less than 10 m²/g, preferably of not less than 100 m²/g, for example of not less than 1000 m²/g, and wherein the reduction layer (24) is porous and has (Continued)

an open porosity in a range from not less than 10% to not more than 90%, preferably from not less than 30% to not more than 70%.

8 Claims, 3 Drawing Sheets

(56) References Cited

U.S. PATENT DOCUMENTS

| | | | | |
|---|---|---|---|---|
| 2009/0081534 | A1* | 3/2009 | Takami | H01M 50/44 |
| | | | | 429/149 |
| 2011/0189530 | A1 | 8/2011 | Torata et al. | |
| 2014/0308566 | A1* | 10/2014 | Saito | H01M 2/166 |
| | | | | 429/144 |
| 2016/0204408 | A1* | 7/2016 | Herle | H01M 4/382 |
| | | | | 429/143 |
| 2018/0315970 | A1* | 11/2018 | Terashima | H01M 10/0587 |

FOREIGN PATENT DOCUMENTS

| | | | |
|---|---|---|---|
| CN | 105226226 A | 1/2016 | |
| EP | 2 469 624 A1 | 6/2012 | |
| GB | 2 070 847 A | 9/1981 | |
| JP | S58-126667 A | 7/1983 | |
| JP | H05343044 A | 12/1993 | |
| JP | 2006073541 A | 3/2006 | |
| JP | 2011-222215 A * | 11/2011 | .......... H01M 10/058 |
| JP | 2011222215 A | 11/2011 | |

OTHER PUBLICATIONS

Chinese First Office Action corresponding to Chinese Patent Application No. 201780073636.0 dated Sep. 6, 2021 (6 pages).

"Practical anti-corrosion engineering construction manual," Apr. 2000, Chemical Industry Press, pp. 80-91 (Chinese language document) (12 pages).

* cited by examiner

SEPARATOR FOR A BATTERY CELL AND BATTERY CELL PROVIDING SUCH A SEPARATOR This application is a 35 U.S.C. 371 National Stage application of PCT/EP2017/078297, filed Nov. 16, 2017, and claims priority to European Application No. EP 16201066.4, filed on Nov. 29, 2016. The entire contents of the above-mentioned patent applications are incorporated herein by reference as part of the disclosure of this U.S. application.

The present invention relates to a separator for a battery cell and to a battery cell comprising such a separator. Such a separator and such a battery cell have the advantage of particularly great long-term stability.

BACKGROUND

Electrochemical energy storage means, such as for example lithium-ion batteries, are in widespread use in many day-to-day applications. They are employed for example in computers, such as laptops, mobile phones, smartphones and for other applications. Such batteries also offer advantages in the presently rapidly developing electrification of vehicles, such as motor vehicles, for instance in electric vehicles or hybrid vehicles.

Battery cells may be configured in very different ways but typically comprise a construction having an anode, a cathode and a separator arranged therebetween.

For example the document U.S. 2013/0224632 A1 describes a separator for an electrochemical battery cell. Such a separator is in particular said to prevent mechanical damage to a battery cell through dendrite growth. This is said to be realized as a result of the separator comprising metallic barriers which block a direct path of the dendrites and thus prevent dendrite growth by kinetic and/or thermodynamic means.

U.S. 2014/0335395 A1 further describes a battery cell wherein an ionically permeable and electrically conductive layer is arranged adjacent to a separator. According to this document this achieves advantages in respect of current distribution and weight.

DISCLOSURE OF THE INVENTION

The present invention relates to a separator arrangement for an electrochemical battery cell comprising an ionically conductive and electrically insulating separator layer, wherein the separator arrangement further comprises a reduction layer comprising a reduction material, wherein the reduction layer has a specific surface area which is in a range of not less than 10 m$^2$/g, preferably of not less than 100 m$^2$/g, for example of not less than 1000 m$^2$/g, and wherein the reduction layer is porous and has an open porosity in a range from not less than 10% to not more than 90%, preferably from not less than 30% to not more than 70%.

This specific surface area is based on the corresponding weight of reduction layer. The specific surface area may be determined by gas adsorption according to the BET method, for example according to DIN ISO 9277:2003-05. The porosity relates to the proportion of free volume, i.e. volume not occupied by a solid, based on the total volume and in particular exhibits open, i.e. outwardly open, pores. The open porosity may be determinable for example by determining the relative density, i.e. the quotient of apparent density, i.e. porous density, and true density, i.e. density of the nonporous material.

An above-described separator arrangement in particular makes it possible to achieve improved longevity and safety of a battery cell fitted with this separator arrangement.

A separator arrangement for an electrochemical battery cell is accordingly proposed. The separator arrangement may in principle be provided for any electrochemical battery cell, a non-limiting example being a lithium-ion cell. The separator arrangement may in particular be provided between an anode and a cathode as is known in principle for separators in electrochemical battery cells and as is hereinbelow described in detail with reference to the battery cell.

The separator arrangement initially comprises in a manner known per se an ionically conducting and electrically insulating separator layer. Said layer may in principle be configured as is known from the prior art and may have ionic and electrical conductivities customary for separators so that the battery may operate in the desired manner. An exemplary ionic conductivity may for instance be in a range of ≥10 mS/cm while a suitable electrical conductivity may for instance be in a range of ≤1 µS/cm, wherein an electrical resistance in a range of >1 MOhm may be present, wherein the above-described examples are in no way limiting.

The separator layer may be for example an especially porous plastics film, for instance made of polypropylene, which may be formed by extrusion and stretching of polymer films for example. Solvents may be used to achieve a suitable porosity of the separator layer. To this end a mixture of the polymer with dibutyl phthalate may be prepared and the dibutyl phthalate may subsequently be dissolved out with a suitable solvent, for instance with alcohol, ether, acetone, benzene, n-hexane. The separator layer may further be made of a nonwoven fabric.

An electrolyte may be disposed in the pores of the separator for example. Also in a manner known per se the electrolyte may comprise a solvent in which one or more ionically conductive salts are dissolved. Aprotic solvents, such as for instance ethylene carbonate, propylene carbonate, dimethyl carbonate or diethyl carbonate, may find use for example. Lithium hexafluorophosphate (LiPF$_6$) is also employable as an ionically conductive salt.

The separator layer may also be porous, for instance have an open porosity. Exemplary porosities are for example in a range of ≥30% to ≤60%, wherein the values relate to free volume as a ratio of total volume.

In addition to the separator layer the above-described separator arrangement comprises a reduction layer. A reduction layer is to be understood as meaning a layer which comprises a reduction material or is made thereof and is therefore suitable for reducing defined substances. For example the reduction layer may be made of a reduction material having a redox potential in a range of +0.16 V or advantageously less against the standard hydrogen potential.

In respect of the redox potential this is determinable in a manner known per se against a normal hydrogen electrode at standard conditions (25° C.; 101.3 kPa (1 bar) air pressure; pH=7.0).

This can in particular make it possible as described hereinbelow to prevent dendrite formation which can result in significant damage to a battery cell.

In the course of a charging operation ions, such as for instance lithium ions in the case of a lithium-ion battery, migrate from the cathode through the separator to the anode facilitated by the electrolyte with simultaneous electron flow in the same direction through an external circuit. During discharging the opposite processes correspondingly occur. Also occurring in a manner known per se is an incorporation of the ions into the active materials where during charging the lithium ions are deinstalled from the cathode and installed/incorporated into the anode.

It is often not possible to entirely prevent impurities from entering a battery cell in the context of the production of the battery cell. Examples include for instance metal particles, such as for instance copper particles, which upon contact with the cathode are oxidized and go into solution as a Cu ion (Cu2+ or Cu+). This can for instance lead to metallic dendrite formation in the battery cell which can in particular continue from the anode to the cathode of a battery cell. In detail this is because copper may be present on the cathode and dissolved/oxidized there on account of the high potential. The copper ions then migrate to the anode and can be deposited there in metallic form as a dendrite. Such dendrites can in turn grow to the cathode and short-circuit the electrodes.

Such an electrical short-circuit between the anode and the cathode can damage or destroy the battery cell. In extreme cases thermal runaway of the battery cell may occur.

Furthermore, such contaminations/effects can result in a significantly reduced lifetime since if such impurities are deposited at the anode these can bring about the reduction of lithium ions to elemental lithium by acting as seeds.

However, the above-described reduction layer makes it possible to prevent or at least reduce such negative effects. This is because the impurities of for instance metal ions come into contact with the reduction layer and are thus reduced to the corresponding metals, the reductant undergoing corresponding oxidation. The risk of corresponding dendrite formation can therefore be prevented or at least markedly reduced since the ions can no longer reach the anode and accordingly can no longer be deposited there as dendrites. However, the impurities are not limited to metals and metal ions in the context of the invention.

A redox potential of the reduction layer of +0.16 V or less and thus the implementation of the reduction layer as a relatively non-noble layer can particularly advantageously ensure that commonly encountered impurities, such as for instance copper ions, can be reduced. To this end the reduction layer should be porous enough to ensure a sufficient permeability, for instance for an electrolyte.

The reduction layer can thus efficiently prevent undesired copper ions for example, such as $Cu^{2+}$, from migrating to the anode. This is because they are reduced at the separator arrangement before they can reach the anode, the reduction layer being correspondingly oxidized. It may be advantageous for the thus-formed species to be insoluble in the electrolyte since said species can then precipitate and does not negatively affect operation of the battery cell.

The above-described redox reactions can be particularly efficient as a result of the reduction layer having a specific surface area which is in a range of not less than 10 $m^2/g$, preferably of not less than 100 $m^2/g$, for example of not less than 1000 $m^2/g$, and as a result of the reduction layer being porous and having an open porosity in a range of not less than 10% to not more than 90%, preferably of not less than 30% to not more than 70%. This makes it possible to significantly reduce the risk of dendrite formation and thus of short-circuit of the battery for instance.

In detail the high specific surface area can have a positive effect on the reaction kinetics of the reaction in progress and thus on the reduction of impurities. Since the reaction kinetics are area-dependent the reduction of impurities at the interface with the electrolyte, i.e. at the surface of the reduction layer can be made markedly more efficient.

In respect of porosity this may be advantageous especially in the abovementioned range in order thus not to inhibit ion flow. In other words it is possible very efficiently to enable the ions of the impurities to reach the surface of the reduction layer to be reduced there.

Thus in particular the above-described combination of specific surface area and open porosity can achieve a synergistic effect to prevent dendrite formation particularly efficiently.

The above-described solution further provides significant advantages over the solutions from the prior art. This is because in this regard metallic contaminants have hitherto been removed using vacuum aspiration systems, brushes, blowers or magnets for example. However, such solutions have often not been able to entirely remove the contaminants present and dendrite growth has thus not been entirely preventable either. Especially smaller particles, for instance having a size of for instance <50 µm, often cannot be removed from the electrode coating for example on account of insufficient forces. Furthermore, brushing to remove impurities can result in mechanical damage to the separator or the electrodes for instance which can negatively affect operation and/or safety and is thus to be avoided.

However, such disadvantages can be avoided by a separator arrangement as described above since removal of metallic particles by mechanical means for instance is not necessary. This can further improve the longevity and safety of battery cells.

It may preferably be provided that the reduction layer is disposed atop the surface of the separator layer. This embodiment can be particularly simple to implement since the reduction layer can be applied in simple fashion.

Suitable processes for applying the reduction layer in principle comprise chemical or physical deposition processes for instance. These include for example metal vapour deposition, in particular under negative pressure, chemical vapor deposition (CVD) or physical vapor deposition (PVD). Also suitable for instance are direct current or alternating current, i.e. DC or AC, sputtering, in particular under argon, or screen printing processes or inkjet printing processes or else spray coating processes, for example of nanoparticles including a binder.

The properties of the applied reduction layer, such as in particular porosity or specific surface area, can be adjusted in a manner known to those skilled in the art by adapting the deposition parameters.

In terms of adjusting porosity adjustment may be effected for example by adjusting the porosity of the separator layer atop which the reduction layer is applied or in the case of sputtering for instance, for example in the form of DC magnetron cathode sputtering, by means of the applied pressure. A higher pressure can reduce porosity while a lower pressure can increase porosity. In addition to adjusting deposition parameters specific surface area can be reduced by smoothing for instance and increased by treatment with oxidative and/or reducing gases. Increasing the specific surface area can be achieved for instance by treating with a mixture of hydrogen and carbon dioxide, with a mixture of carbon monoxide, hydrogen, water and nitrogen or with a mixture of carbon monoxide and oxygen.

Exemplary parameters for a sputtering process for applying a reduction layer comprise for instance a power density of 0.1 to 10 $W/cm^2$, for example of 1.2 $W/cm^2$, a deposition duration of 1 second to 1 hour, for example of 5 min, and a pressure in the deposition chamber of 0.01 to $10 \times 10^{-6}$ mbar, for example of $6 \times 10^{-6}$ mbar.

It is possible in the abovementioned processes for example to generate a particularly thin layer thickness of the reductant which can result in advantages in terms of material economy and thus in the production costs entailed but also advantages in terms of low weight which can be advantageous for example in mobile or portable applications. This embodiment in particular can also generate a surface that is particularly advantageous for a corresponding redox reaction and can thus favor said reaction significantly. In particular the above-described processes can be used to generate a reduction layer having the above-described porosity and specific surface area.

It may further be preferable for the reduction material to be a metal. Metals in particular can be effective reductants and can realize the above-described redox reaction particularly reliably and correspondingly reduce the risk of damage to a battery cell particularly reliably. Furthermore metals in particular are stable and not subject to undesired side reactions under the conditions prevailing in a battery cell, thus making it possible to provide a battery cell with the above-described safety improvement even after a relatively lengthy operating time.

Exemplary metals which have proven suitable in the context of the present invention comprise for example titanium, aluminum and nickel. In addition to suitable redox properties the above-described metals have the particular feature that they are converted into insoluble compounds in an oxidation under the conditions prevailing in a battery cell. Conversions that may occur include for example conversion of aluminum into $AlO_xF_y$, or of titanium into $TiO_2$ or $TiO_xF_y$.

It may moreover be preferable for the reduction layer to be provided with a porous protective layer on the side opposite the separator layer. Providing such a protective layer can prevent dissolution of the reduction layer which can further improve longevity. This protective layer is advantageously likewise porous to allow the especially liquid electrolyte comprising the impurities access to the reduction layer. The protective layer can moreover allow efficient electrical insulation between the electrode and the reduction layer if the protective layer is in the form of an electrical insulator for instance. The protective layer may for example be a polymer layer, such as for instance a layer made of a binder material, for example polyvinylidene fluoride (PVDF), styrene-butadiene rubber (SBR), sodium croscarmellose (NaCMC). The protective layer may further be made of the abovementioned materials in combination with ceramic particles such as for example aluminum oxide ($Al_2O_3$).

By way of example the binder material or the binder material admixed with ceramic particles may be mixed with dibutyl phthalate and a solvent and applied atop the reduction layer. The dibutyl phthalate may subsequently be dissolved out with a suitable solvent, for example an alcohol, an ether, with acetone, benzene or n-hexane in order thus to bring about a porous structure.

For further technical features and advantages of the above-described separator arrangement reference is hereby made to the following description of the battery cell, to the figures and to the description of the figures and vice versa.

The present invention further provides a battery cell comprising an anode, a cathode and a separator layer arranged between the anode and the cathode. It is intended that the separator layer is part of a separator arrangement as described in detail hereinabove.

The battery cell accordingly comprises an anode, a cathode and a separator layer arranged between the anode and the cathode. The battery cell may be a lithium-ion cell for example.

For the exemplary case of a lithium-ion battery the anode may for example comprise or be made of metallic lithium or of a material which can incorporate/intercalate and deincorporate/deintercalate lithium ions. Such an anode material may be applied, for instance by knife coating, atop a current collector. Exemplary anode materials comprise for instance carbon, for example amorphous carbon, graphite or carbon black, silicon, tin or lithium titanate. Alternatively or in addition the current collector may, for example, be made of copper, for instance in the form of copper foil. Correspondingly, the cathode, also for the purely exemplary case of a lithium-ion battery, may comprise or be made of for example lithium-nickel-manganese-cobalt oxide (NMC, for example HE-NMC), spinel or lithium-cobalt oxide ($LiCoO_2$) and may likewise be applied atop a current collector, for instance made of aluminum, for example aluminum foil. Both the cathode material and the anode material may optionally be disposed in a binder, for example polyvinylidene fluoride (PVDF) together for instance with a conductivity additive, such as an electrically conductive carbon compound, for example graphite or carbon black.

In respect of the separator arrangement reference is made to the description hereinabove. The battery cell may for example be in the form of a rolled or wound arrangement also known as a jellyroll in order to allow high performance data. However, the battery cell is not limited to the above-described embodiment but may in principle assume any desired shape.

In conclusion an above-described battery cell can accordingly achieve improved longevity and improved safety. It may thus in particular be provided that a metallic impurity is present inside the battery cell, for example in the liquid electrolyte, the reduction layer having a greater non-nobility than the for example metallic impurity.

The reduction layer may particularly preferably be positioned between the separator layer and the anode. Reduction of the impurities, for example of reducible metal salts, for instance copper salts, can be efficiently prevented in this embodiment especially. This is because in this embodiment in particular the reduction layer is in the vicinity of the anode where reduction of the impurities is particularly favored.

However, it may in principle also be advantageous to position the reduction layer between the separator layer and the cathode.

For further technical features and advantages of the above-described battery cell reference is hereby made to the description of the separator arrangement, to the figures and to the description of the figures and vice versa.

DESCRIPTION OF THE DRAWINGS

Further advantages and advantageous embodiments of the subject matter of the invention are shown in the drawings and elucidated in the description which follows, wherein the described features may constitute subject matter of the present invention individually or in any desired combination provided that the opposite is not clear from the context. It should be noted that the drawings are merely of a descriptive character and are not intended to limit the invention in any way whatsoever. In the drawings.

DETAILED DESCRIPTION

Figure 1:
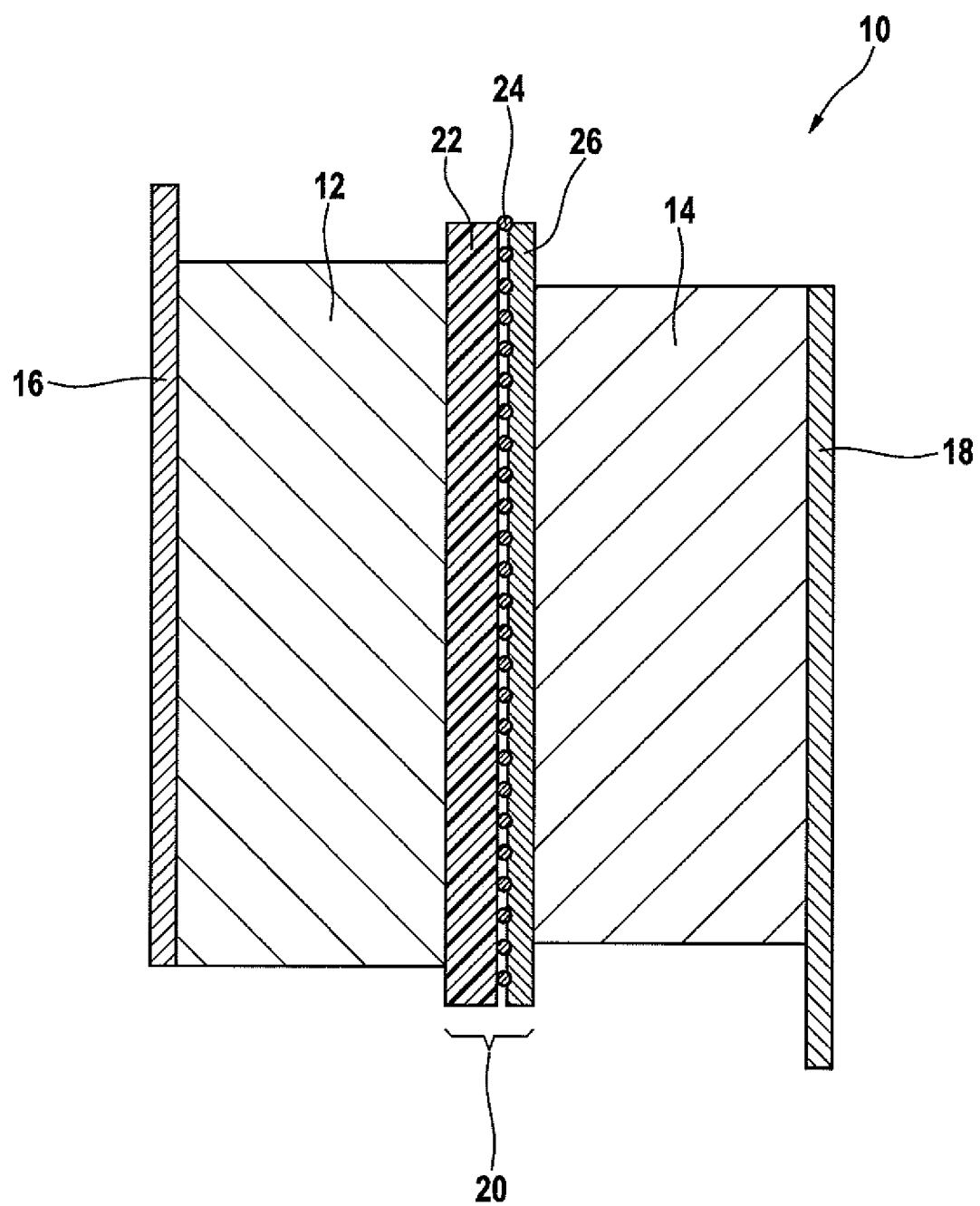
FIG. 1 is a schematic view of a battery cell comprising a separator arrangement.

FIG. 1 shows a battery cell 10 comprising an anode 12 and a cathode 14. Provided adjacent to the anode 12 and in electrical contact therewith is a copper foil as current collector 16 and provided adjacent to the cathode 14 and in electrical contact therewith is an aluminum foil as current collector 18.

A separator arrangement 20 is further provided between anode 12 and cathode 14. The separator arrangement 20 comprises an ionically conductive and electrically insulating separator layer 22 and a reduction layer 24, wherein the reduction layer 24 is made of a reduction material that may have a redox potential in a range of +0.16 V or less. The reduction layer may be made of a porous layer of titanium, aluminum or nickel for instance. It is further provided that the reduction layer 24 has a specific surface area which is in a range of not less than 10 $m^2/g$, preferably of not less than 100 $m^2/g$, for example of not less than 1000 $m^2/g$, and wherein the reduction layer 24 is porous and has an open porosity in a range of not less than 10% to not more than 90%, preferably of not less than 30% to not more than 70%.

FIG. 1 further shows that the reduction layer 24 is provided with a protective layer 26 on the side opposite the separator layer 22.

Figure 2:
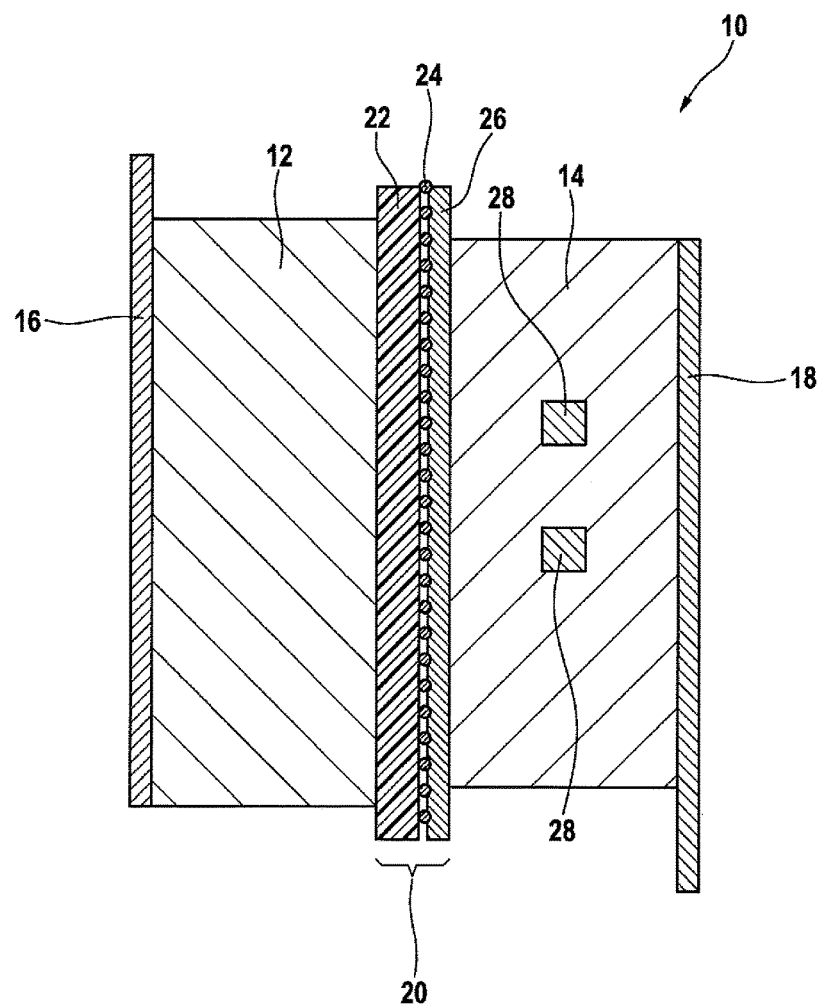
FIG. 2 is a schematic view of the battery cell from FIG. 1 comprising impurities disposed in the cathode.
Figure 3:
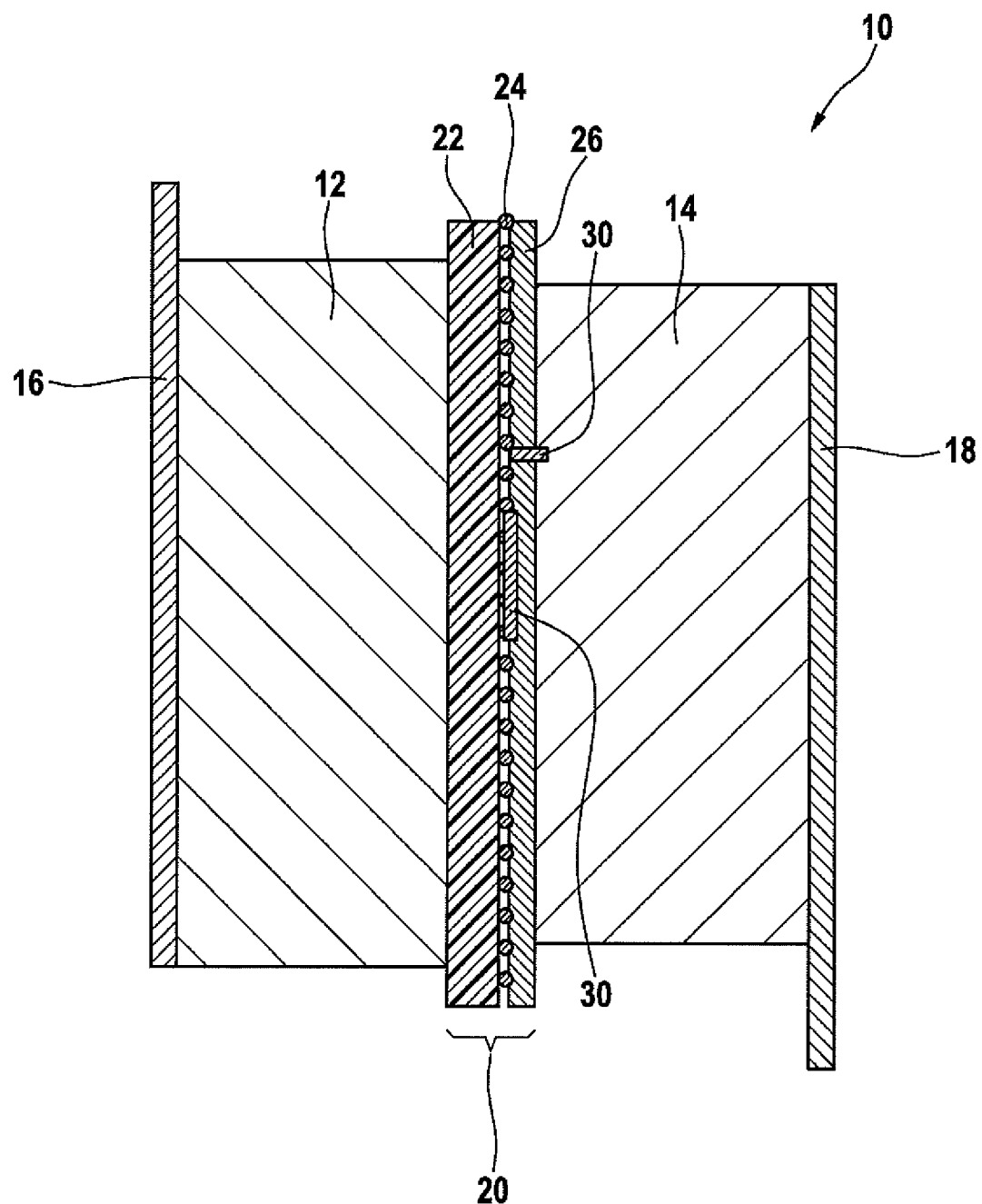
FIG. 3 is a schematic view of the battery cell from FIG. 2 comprising impurities reduced at the reduction layer.

The positive effect of the separator layer 20, i.e. of the battery cell 10 provided with the separator layer 20, is shown in FIGS. 2 and 3. FIG. 2 shows a discharged battery cell 10 in which a metallic impurity 28 is disposed in the cathode 14. During a charging operation the metallic impurity undergoes oxidative dissolution and diffuses as a metal ion in the direction of the separator arrangement 20 and contacts the reduction layer 24. The metal ion is reduced there and in turn deposited in elemental form as metal particle 30.

The invention claimed is:

1. An electrochemical battery cell comprising:
   an anode;
   a cathode; and
   a separator arrangement between the anode and the cathode, the separator arrangement including:
   an ionically conductive and electrically insulating separator layer; and
   a reduction layer consisting of a reduction material, wherein the reduction layer has a specific surface area which is not less than 10 $m^2/g$, and wherein the reduction layer is porous and has an open porosity in a range from not less than 30% to not more than 70%, wherein the reduction layer is made of a reduction material having a redox potential in a range of +0.16 V or less against the standard hydrogen electrode,
   wherein the reduction layer is provided with a porous protective layer on a side of the reduction layer opposite the separator layer, and
   wherein the protective layer is made of an electrically insulating material.

2. The battery cell as claimed in claim 1, characterized in that the reduction layer is disposed atop the surface of the separator layer.

3. The battery cell as claimed in claim 1, characterized in that the reduction layer is positioned between the separator layer and the anode.

4. The battery cell as claimed in claim 1, characterized in that the battery cell is a lithium-ion cell.

5. The battery cell as claimed in claim 1, wherein the reduction layer has a specific surface area which is not less than 100 $m^2/g$.

6. The battery cell as claimed in claim 1, wherein the reduction layer has a specific surface area which is not less than 1000 $m^2/g$.

7. The battery cell as claimed in claim 1, wherein the reduction layer is a porous metal layer.

8. The battery cell as claimed in claim 7, wherein the porous metal layer includes said reduction material selected from the group consisting of aluminum, titanium and nickel.

* * * * *